United States Patent
Van der Wijst et al.

(10) Patent No.: US 7,259,800 B2
(45) Date of Patent: Aug. 21, 2007

(54) TELEVISION SIGNAL RECEIVER WITH A UNIVERSAL OUTPUT FOR SURFACE-ACOUSTIC WAVE FILTERS OF DIFFERENT TYPES

(75) Inventors: Hendricus Martinus Van der Wijst, Veldhoven (NL); Ernst Bressau, Singapore (SG)

(73) Assignee: NXP B.V., Eindhoven (NL)

( * ) Notice: Subject to any disclaimer, the term of this patent is extended or adjusted under 35 U.S.C. 154(b) by 354 days.

(21) Appl. No.: 10/499,467

(22) PCT Filed: Dec. 19, 2002

(86) PCT No.: PCT/IB02/05651

§ 371 (c)(1), (2), (4) Date: Jun. 18, 2004

(87) PCT Pub. No.: WO03/056814

PCT Pub. Date: Jul. 10, 2003

(65) Prior Publication Data

US 2005/0105004 A1    May 19, 2005

(30) Foreign Application Priority Data

Dec. 22, 2001 (DE) .............................. 101 63 798

(51) Int. Cl.
 *H04N 5/50* (2006.01)
 *H04N 5/44* (2006.01)
(52) U.S. Cl. ..................... 348/731; 348/725; 348/732; 348/705; 455/190.1; 455/286
(58) Field of Classification Search ................ 348/731, 348/732, 733, 725, 705, 706; 455/180.1, 455/133, 137, 190.1, 286, 306, 307
See application file for complete search history.

(56) References Cited

U.S. PATENT DOCUMENTS

| | | | | |
|---|---|---|---|---|
| 5,577,270 A | * | 11/1996 | Sakai ....................... | 455/180.1 |
| 5,737,035 A | * | 4/1998 | Rotzoll ...................... | 348/725 |
| 5,867,771 A | * | 2/1999 | Ruitenburg .................. | 455/86 |
| 6,044,251 A | * | 3/2000 | Brekelmans ............. | 455/150.1 |
| 6,094,229 A | * | 7/2000 | Ohshima .................... | 348/555 |
| 6,128,043 A | * | 10/2000 | Tulder ....................... | 348/555 |
| 6,252,633 B1 | * | 6/2001 | Ruitenburg ................ | 348/725 |
| 6,559,898 B1 | * | 5/2003 | Citta et al. ................. | 348/723 |
| 6,683,656 B1 | * | 1/2004 | Kikuchi ..................... | 348/729 |
| 6,725,463 B1 | * | 4/2004 | Birleson .................... | 725/151 |

\* cited by examiner

*Primary Examiner*—David Ometz
*Assistant Examiner*—Jean W. Désir

(57) ABSTRACT

The invention relates to a television signal receiver comprising a radio-frequency tuner (1) and at least one subsequent surface-acoustic wave filter (2), in which the radio-frequency tuner (1) filters a RF television signal applied to its input and converts it to an intermediate-frequency television signal which is coupled to the surface-acoustic wave filter (2). The RF tuner (1) has at least one output stage (16) which supplies the IF television signal converted to the intermediate frequency. The output stage (16) is directly connected to an output (6) of the RF tuner (1), while a switch (10) is associated with it, by means of which switch the IF television signal is supplied to a second output (8). A further switch (11) is associated with the second output (8), by means of which switch the associated output (8) is switchable to a fixed reference potential. The RF tuner (1) precedes at least one surface-acoustic wave filter (2), in which each time a first input (12) of the surface-acoustic wave filter (2) is coupled to a first output (6) of the RF tuner (1), and a second input (13) of the surface-acoustic wave filter (2) is coupled to the second output (8) of the RF tuner (1) via the first switch (10), and, for switching the filter characteristic of the television signal receiver, alternately the second input (13) of the surface-acoustic wave filter (2) can be coupled to the same IF television signal by means of the associated switch (10).

7 Claims, 1 Drawing Sheet

Figure 1:
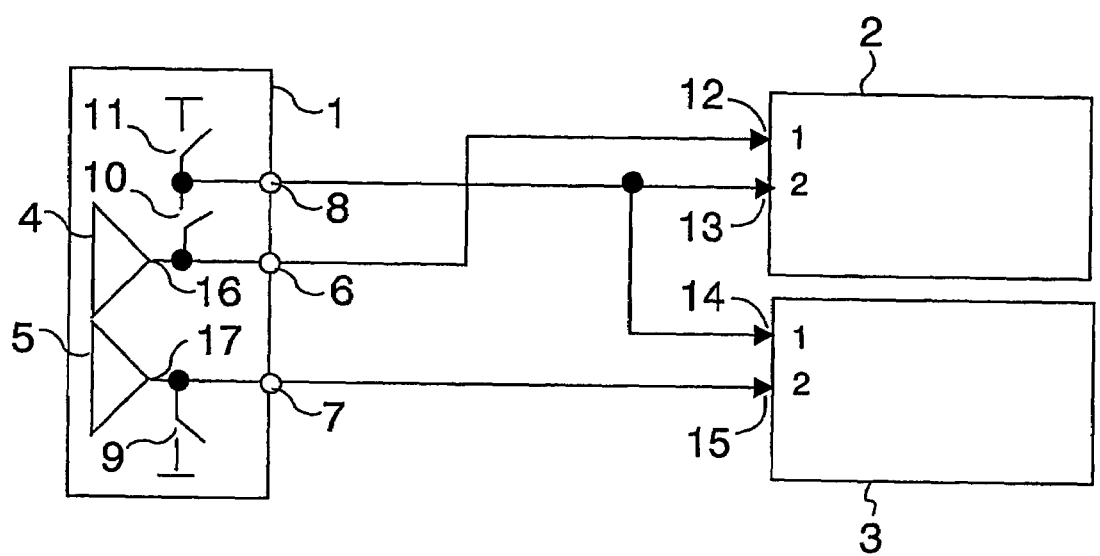

TELEVISION SIGNAL RECEIVER WITH A UNIVERSAL OUTPUT FOR SURFACE-ACOUSTIC WAVE FILTERS OF DIFFERENT TYPES

The invention relates to a television signal receiver comprising a radio-frequency tuner and at least one subsequent surface-acoustic wave filter, in which the radio-frequency tuner filters a RF television signal applied to its input and converts it to an intermediate-frequency television signal which is coupled to the surface-acoustic wave filter which may be switchable.

Such television signal receivers are particularly implemented with a plurality of surface-acoustic wave filters of different types, which are also switchable, for receiving RF television signals of different transmission standards. The filter characteristics of the surface-acoustic wave filters are determined by a given connection occupancy of the IF television signal and a fixed reference potential at the inputs of the surface-acoustic wave filters. For surface-acoustic wave filters of different types, an additional circuit based on different switching logics of the surface-acoustic wave filters must be used to activate the filters. There are also concepts in which the filter characteristics of the surface-acoustic wave filters are switched in such a way that different inputs of the surface-acoustic wave filters are switched to a reference potential. The drawback of these concepts is the multitude of required switches and the attendant large number of components.

It is an object of the invention to reduce the number of components for such a television signal receiver for different surface-acoustic wave filters, inter alia, for multistandard reception.

According to the invention, this object is solved in that the radio-frequency tuner has at least one output stage which supplies the IF television signal converted to the intermediate frequency, in that the output stage is connected to an output of the radio-frequency tuner, in that a switch is associated with the output stage, by means of which switch the IF television signal is supplied to a second output of the radio-frequency tuner, in that a further switch is associated with the second output, by means of which switch the associated output is switchable to a fixed reference potential, in that the radio-frequency tuner precedes at least one surface-acoustic wave filter, in which each time a first input of the surface-acoustic wave filter is coupled to a first output of the radio-frequency tuner, and a second input of the surface-acoustic wave filter is coupled to the second output of the radio-frequency tuner via the first switch, and in that, for switching the filter characteristic of the television signal receiver, alternately the second input of the surface-acoustic wave filter can be coupled to the same IF television signal by means of the associated switch.

The radio-frequency tuner has at least one output stage which supplies the RF television signal converted to the intermediate frequency. Two series-arranged switches are associated with the output stage, by means of which switches the two associated outputs are switchable to a reference potential, or by means of which switches the associated outputs supply the same IF television signal.

A subsequently arranged surface-acoustic wave filter, whose first input requires a constant IF television signal and its second input requires either the same IF television signal for a first filter characteristic, or a fixed reference potential (for a second filter characteristic), is directly connected at its first input to an output of the RF tuner. The second output is coupled to the same output stage of the RF tuner via one of the two series-arranged switches. The switches associated with the output of the RF tuner thereby allow a switch-over of different filters in the surface-acoustic wave filters. In this way, the filter characteristic of the television signal receiver can be switched, for which purpose only the two switches associated with the output stage are required.

In the case of activated first switches, the output of the RF tuner is coupled to the two inputs of the surface-acoustic wave filter and thereby allows a switch-over of the surface-acoustic wave filter. Additional circuits or circuit leads connecting the RF tuner to the surface-acoustic wave filter are not necessary.

On the one hand, this leads to a reduction of the number of required switches and, on the other hand, these switches can be constructed together with the RF tuner because they are associated with the output stages of this tuner. This leads to a considerable reduction of costs of manufacturing the receiver.

It is preferred that the filter characteristic of the surface-acoustic wave filter changes in dependence upon whether the second input is coupled to the output of the radio-frequency tuner and that the filter characteristic of the surface-acoustic wave filter is switchable by means of the first and the second switch associated with the output of the radio-frequency tuner.

Surface-acoustic wave filters of this type have two inputs, both of which can receive signals to be filtered. Alternatively, however, the second input must be connected to a reference potential, which leads to a switch of the filter characteristic of the surface-acoustic wave filter. The first input remains the active input, whose input signal is filtered with the corresponding, activated filter characteristic.

In the television signal receiver according to the invention, such filters have one of their inputs connected to the output of the RF tuner. Due to the alternate activation of the switches associated with the output of the RF tuner, the filter characteristic of such a surface-acoustic wave filter is switched in a simple manner.

In a further embodiment of the invention, a plurality of possibly switchable surface-acoustic wave filters with different switching characteristics can be used without any additional number of components. Only a second output stage of the RF tuner with an associated switch is required for this purpose.

In order to switch between the two filter characteristics of the surface-acoustic wave filter of this type, an IF television signal must be supplied to either the first input or to the second input of the surface-acoustic wave filter. The respective other input is then connected to a fixed reference potential.

Surface-acoustic wave filters of both these types may be combined in a circuit arrangement according to the invention. In the television signal receiver according to the invention, this provides the possibility of using both filter types in one circuit arrangement, i.e. a multitude of such filters or switchable filter characteristics can be used simultaneously and in combination. The combination of the filters of different types allows versatile use of the receivers.

In multistandard television receivers, switching operations between a multitude of filter characteristics have to be performed. Nevertheless, the television signal receiver according to the invention can be realized with a small number of components.

The invention also relates to a multistandard television signal receiver for receiving television signals of different transmission standards, and the surface-acoustic wave filters and their filter characteristics for adaptation to IF television signals of different transmission standards are switchable by means of the switches.

The combination of surface-acoustic wave filters of different types, which has become possible by the television signal receiver according to the invention, is supplemented in that the outputs and the associated switches of the RF tuner are implemented on an integrated circuit.

These and other aspects of the invention are apparent from and will be elucidated with reference to the embodiments described hereinafter.

In the drawing:

The sole FIGURE (i.e. FIG. 1) shows a television signal receiver according to the invention, comprising a RF tuner 1 which is shown only partially.

The FIGURE shows, in the RF tuner 1, an output stage 16 of an amplifier 4 which supplies an intermediate-frequency television signal. This IF television signal is gained in a manner not shown in the FIGURE from an RF television signal applied to the input of the RF tuner by conversion to the intermediate-frequency range.

The RF tuner 1 comprises a second output stage 17 of a second amplifier 5, which supplies the phase-opposed IF television signal.

Two switches 10 and 11, by means of which the IF television signal from the output of the amplifier 4 can be coupled to reference potential, is associated with the first output stage 16. A first output 6 of the RF tuner is coupled to the output stage 16 of the amplifier 4 and to the switch 10. By means of the switch 10 and the switch 11 arranged in series with the switch 10, the output 6 can be switched in such a way that it alternately conveys the IF television signal or is low-ohmic coupled to the reference potential. A second output 8 can be switched via the switch 10 in such a way that it alternately conveys the IF television signal or is low-ohmic coupled to the reference potential.

A switch 9, by means of which a third output 7 of the RF tuner 1 associated with the amplifier 5 is also alternately switchable to the IF television signal or is low-ohmic coupled to the reference potential, is associated with the second output stage 17.

Moreover, the television signal receiver shown in the FIGURE comprises two surface-acoustic wave filters 2 and 3 of different types.

The surface-acoustic wave filter 2, hereinafter referred to as SAW filter, has two inputs 12 and 13. Both inputs can simultaneously receive signals to be filtered. The second input 13 can be coupled to a reference potential for the purpose of switching the filter characteristic. The first input then remains the active input, whose input signal is filtered with the relevant filter characteristic. The first input 12 is coupled to the first output 6 of the RF tuner 1. The second input 13 is coupled to the output 8 of the RF tuner 1.

The SAW filter 3 has two inputs 14 and 15 and is a filter of a different type than SAW filter 2. Its two inputs 14 and 15 may basically receive signals to be filtered. However, alternately, one of the inputs must be coupled to a reference potential, which leads to switching of the filter characteristic of the SAW filter. The other input then remains the active input, whose input signal is filtered with the corresponding, activated filter characteristic.

The first input 14 of the SAW filter 3 is connected to the second output 8 of the RF tuner, and the second input 15 of this SAW filter 3 is connected to the third output 7 of the RF tuner 1.

The first SAW filter 2 is implemented in such a way that its filter characteristic is switched in dependence upon whether the input 13 is coupled to reference potential or is coupled to the same IF television signal at input 13. For example, if switch 11 is activated and switch 10 is open, so that the input 13 of the SAW filter 2 is coupled to reference potential, the signal applied to the input 12 of the SAW filter 2 is filtered with a first filter characteristic. If the first switch 10 is activated and the second switch 11 is open, the same IF television signal is applied to both the input 12 and the input 13 of the SAW filter 2 and is filtered with a second filter characteristic of the SAW filter 2.

The switch 11 is simultaneously used for switching the filter characteristic of the second SAW filter 3. The second SAW filter 3 is implemented in such a way that its filter characteristic is switched in dependence upon which of its inputs 14 or 15 is coupled to reference potential. For example, if switch 11 is activated and hence the first input 14 of the SAW filter 3 is coupled to reference potential, the signal applied to the second input 15 of the SAW filter 3 is filtered with a first filter characteristic. However, if the switch 9 is activated and hence the second input 15 of the SAW filter 3 is coupled to reference potential, the signal applied to the first input 14 of the SAW filter 3 is filtered with a second filter characteristic.

It is apparent from the example that the switches 9, 10 and 11 may trigger a plurality of functions. Particularly, the filter characteristics of a plurality of SAW filters of different types can be switched or activated or deactivated by means of the switches. This reduces the number of switches as compared with state-of-the-art circuit arrangements. By associating the switches with the outputs 6, 7 and 8 of the RF tuner and its amplifiers 4 and 5, the switches can be built up together with these amplifiers in a possibly integrated form, so that this leads to a further simplification.

The invention claimed is:

1. A television signal receiver comprising a radio-frequency tuner (1) and at least one subsequent surface-acoustic wave filter (2), in which the radio-frequency tuner (1) filters a RF television signal applied to its input and converts it to an intermediate-frequency television signal which is coupled to the surface-acoustic wave filter (2), characterized in that the radio-frequency tuner (1) has at least one output stage (16) which supplies the IF television signal converted to the intermediate frequency, in that the output stage (16) is connected to an output (6), in that a switch (10) is associated with the output stage (16), by means of which switch the IF television signal is supplied to a second output (8), in that a further switch (11) is associated with the second output (8), by means of which switch the associated output (8) is switchable to a fixed reference potential, in that the radio-frequency tuner (1) precedes at least one surface-acoustic wave filter (2), in which each time a first input (12) of the surface-acoustic wave filter (2) is coupled to a first output (6) of the radio-frequency tuner (1), and a second input (13) of the surface-acoustic wave filter (2) is coupled to the second output (8) of the radio-frequency tuner (1) via the first switch (10), and in that, for switching the filter characteristic of the television signal receiver, alternately the second input (13) of the surface-acoustic wave filter (2) can be coupled to the same IF television signal by means of the associated switch (10).

2. A television signal receiver as claimed in claim 1, characterized in that the surface-acoustic wave filter (2) is implemented in such a way that its filter characteristic changes in dependence upon whether the second input (13) of the surface-acoustic wave filter (2) is coupled to the output stage (16) of the radio-frequency tuner (1), and in that the filter characteristic of the surface-acoustic wave filter (2)

is switchable by means of the switch (10) associated with the output stage (16) of the radio-frequency tuner (1), or whether the second input (13) is coupled to a fixed reference potential by means of the switch (11) associated with the second output (8).

3. A television signal receiver as claimed in claim 1, characterized in that a second surface-acoustic wave filter (3), in which a first input (14) of the surface-acoustic wave filter (3) is coupled to a second output (8) of the radio-frequency tuner (1) and a second input (15) of the surface-acoustic wave filter (3) is coupled to a third output (7) of the radio-frequency tuner (1) is implemented in such a way that the filter (3) is switchable in dependence upon which of its inputs (14, 15) is coupled to reference potential, and in that the surface-acoustic wave filter (3) can be switched by means of the switches (9 and 11).

4. A television signal receiver as claimed in claim 1, characterized in that said television signal receiver is a multistandard television signal receiver including surface-acoustic wave filters of different types (2, 3) for receiving television signals of different transmission standards, and in that the surface-acoustic wave filters (2, 3) and their filter characteristics for adaptation to IF television signals of different transmission standards are switchable by means of the switches (9 to 11).

5. A television signal receiver as claimed in claim 1, characterized in that the outputs (6 to 8) and the associated switches (10, 11) of the radio-frequency tuner (1) are implemented on an integrated circuit.

6. A television apparatus including a television signal receiver as claimed in claim 1.

7. A video recorder including a television signal receiver as claimed in claim 1.

* * * * *